United States Statutory Invention Registration [19]

[11] Reg. Number: H647

Johnson et al. [43] Published: Jul. 4, 1989

[54] DISK PERFORMANCE BY CO-EXTRUSION

[75] Inventors: Gerard F. Johnson; Francis E. Walker, both of Cincinnati, Ohio

[73] Assignee: The United States of America as represented by the Secretary of the Air Force, Washington, D.C.

[21] Appl. No.: 156,125

[22] Filed: Feb. 16, 1988

[51] Int. Cl.[4] ..... B23P 17/00

[52] U.S. Cl. ..... 29/417

[58] Field of Search ..... 29/417, 526.3; 72/258

[56] References Cited

U.S. PATENT DOCUMENTS

| | | | |
|---|---|---|---|
| 3,285,786 | 11/1966 | Katz | 136/205 |
| 3,566,741 | 3/1971 | Sliney | 89/36 |
| 3,657,804 | 4/1972 | Krock et al. | 29/527.7 |
| 3,880,606 | 4/1975 | Boltinghouse et al. | 29/417 |
| 4,110,131 | 8/1978 | Gessinger | 29/417 X |
| 4,598,856 | 7/1986 | Eguiguren et al. | 72/258 X |

FOREIGN PATENT DOCUMENTS

| | | | |
|---|---|---|---|
| 9008188 | 4/1979 | Japan | 72/258 |
| 647025 | 2/1979 | U.S.S.R. | 72/258 |

*Primary Examiner*—Deborah L. Kyle

*Assistant Examiner*—Michael J. Carone

*Attorney, Agent, or Firm*—Bobby D. Scearce; Donald J. Singer

[57] ABSTRACT

A method for fabricating a gas turbine engine disk by co-extrusion is described which comprises the steps of preparing a cylindrical shaped preform billet having a central bore region of preselected radius r and comprising a first material, and a rim region surrounding the bore region to a radius R of the preform billet and comprising a second material, extruding the preform billet at preselected extrusion temperature through an extrusion die to form an extrusion product of preselected reduction, and removing the disk from the extrusion product.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DISK PERFORMANCE BY CO-EXTRUSION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to methods for the fabrication of high temperature strength engine components, and more particularly to a co-extrusion method for manufacturing gas turbine engine disks for high temperature operation.

In the operation of gas turbine engines, temperatures encountered by engine components require that a rotating turbine disk within the engine preferably exhibit high temperature resistance to creep and stress rupture in the rim of the disk, and high temperature ultimate tensile strength in the bore. Typical rotating engine components which are exposed to high operating temperatures and wherein strength characteristics in the rim different from that of the bore are desirable include components in all stages of the compressor spool and all other turbine disks exposed to hot gas flow downstream of the combustor region of the engine. Prior art fabrication methods for engine disks having different rim/bore materials consist chiefly of inertia welding a bore or web of preselected material, size and configuration to a ring of different material and corresponding size comprising the rim of the finished disk. In the inertia welding process, the bore/web is rotated at preselected high speed and pushed against the stationary rim to generate by friction heat required to make a weld between bore and rim. The heat affected zone in such welds is characteristically narrow as compared to that obtained by fusion welding processes. Engine disks fabricated by the inertia welding process chiefly consist of bores of titanium base and nickel base superalloy fatigue (low and high) and/or burst (high ultimate tensile strength) resistant type metals and alloys, including Ti6-4, Ti-17, Ti6-2-4-6, Rene-95, Inco-718, Merl-76, In-100, and Rene-88DT, and rims of respective similar metals and alloys, including Ti6-2-4-2, IMI-829, Astroloy, R-88DT, In-100, U-500, U-700, U-720, and Rene-41, wherein a respective pair of materials must be selected for amenability to welding by the inertia process. The inertia welding process for fabricating engine disks therefore suffers from certain shortcomings including limitation on bore/rim material selection to those combinations amenable to inertia welding. undesirably low attainable heat affected zone/weld thickness between bore and rim, low strength or embrittlement of the material in the bore/rim weld interface, and machine capacity limitations due to large weld surface areas and/or large diameters.

The invention solves or reduces in critical importance problems with prior methods associated with the fabrcation of engine disks for turbine engines by providing a co-extrusion method for fabricating gas turbine engine disks having high temperature resistance to creep and stress rupture in the rim and high tensile strength and/or high fatigue (low) or crack growth rate resistance in the bore or web, wherein the two materials comprising, respectively, the rim and bore of the disk are simultaneously co-extruded at a appropriate preselected extrusion temperature from a preform billet of the two materials, resulting in a solid state metallurgical bond between the two materials, the extrusion being subsequently processed thermomechanically (e.g. by forging) and/or machined to achieve the desired shape or to perform appropriate mechanical work reductions to desired product size. The method of the invention allows formation of disks from substantially any combination of materials desired for the rim and bore, respectively. and, accordingly, preferred combinations of titanium base and nickel base superalloy fatigue (low and high) and/or burst (high ultimate tensile strength) resistant type metals and alloys, including Ti6-4, Ti-17, Ti6-2-4-6, Rene-95, Rene-88DT, In-400, and Merl-76, for the bore and creep rupture resistance type metals and alloys, including Ti6-2-4-2, IMI-829, Udimet-500, Udimet-700, Udimet-720, and Astroloy, for the rim may be used, many of which which were not practical using prior disk fabrication methods (e.g., inertia welding). The preform billet may comprise any combination of wrought, powder or cast material in any combination of alloys in any number of concentric layers (rings) to achieve desired product characteristics. Components fabricated from extrusions made according to the invention have improved and predictable metallurgical and structural properties as compared to those made by the more expensive inertia welding process.

It is therefore a principal object of the invention to provide an improved method for fabricating high temperature resistant gas turbine engine disks.

It is a further object of the invention to provide a method for fabricating gas turbine disks by co-extrusion.

It is a further object of the invention to provide an improved gas turbine engine disk fabricated by co-extrusion.

These and other objects of the invention will become apparent as the detailed description of representative embodiments proceeds.

SUMMARY OF THE INVENTION

In accordance with the foregoing principles and objects of the invention, a method for fabricating a gas turbine engine disk by co-extrusion is described which comprises the steps of preparing a cylindrical shaped preform billet having a central bore region of preselected radius r and comprising a first material, and a rim region surrounding the bore region to a radius R of the preform billet and comprising a second material, extruding the preform billet at preselected extrusion temperature through an extrusion die to form an extrusion product of preselected reduction, and removing the disk from the extrusion product.

DESCRIPTION OF THE DRAWINGS

The invention will be clearly understood from the following detailed description of representative embodiments thereof read in conjunction with the accompanying drawings wherein.

DETAILED DESCRIPTION

Figure 1:
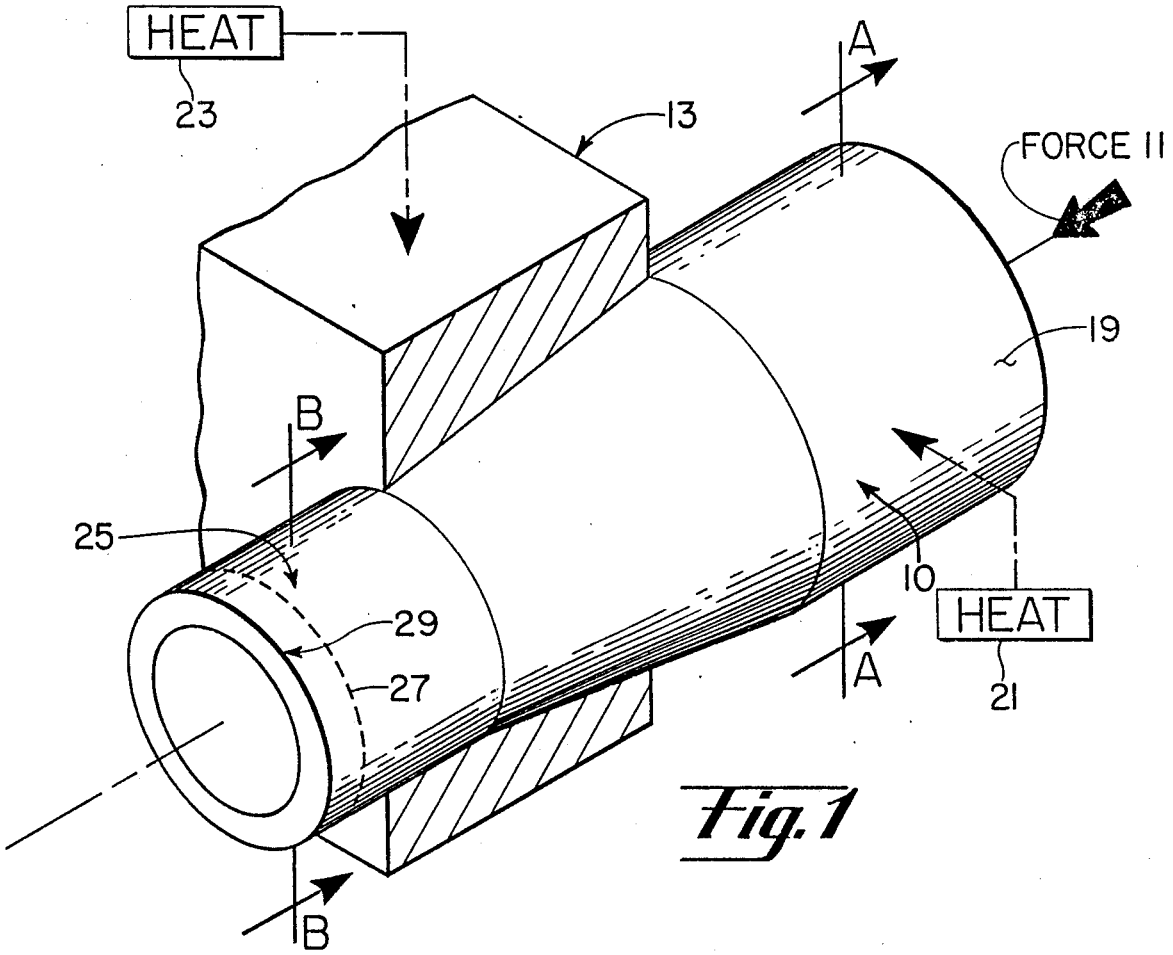
FIG. 1 is a schematic perspective view, partially in section, of an extrusion die and co-extruded preform billet of the invention.
Figure 2:
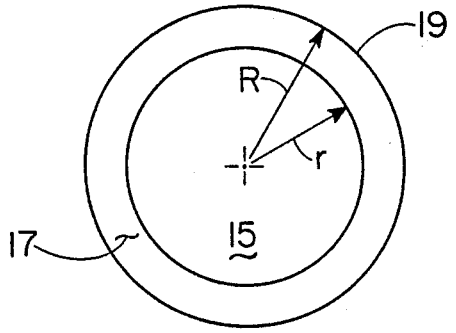
FIG. 2 is a view along line A—A of the preform billet of FIG. 1.

Referring now to the drawings, shown in FIG. 1 is a schematic perspective view, partially in section, of a co-extrusion preform billet 10 extruded under the influence of a conventionally applied force 11 through extrusion die 13 according to the method of the invention. Referring additionally to FIG. 2, which is a sectional view along line A—A of preform billet 10, it is seen that preform billet 10 comprises two or more components 15, 17 in the form of a cylindrical bore component 15 and rim component 17. As discussed above, bore component 15 is selected to provide high ultimate tensile strength in the central region of the finished engine disk and, accordingly, may preferably comprise Ti6-4, Ti-17, Ti6-2-4-6, Rene-95, Rene-88DT, Inco-718, In-100, or Merl-76, or similar material as would occur to one with skill in the field of the invention. Rim component 17 is selected to provide high temperature resistance to creep and stress rupture in the rim region of the finished engine disk and, accordingly, may preferably comprise Ti6-2-4-2, IMI-829, Astroloy, Udimet-500, Udimet-700, Udimet-720, Rene-41, or Merl-76. Components 15, 17 may be in any suitable form such as wrought metal, RST powder, casting or other form with substantially any heat treat history, the same not limiting the invention herein. Further, additional rings of metals/alloys in selected thicknesses may be included between components 15, 17 for attaining any desirable radial variation in structural or metallurgical properties in the finished product engine disk. All components 15,17 may be contained in an extrusion can 19 of appropriate size and material. For most extrusions performed in demonstration of the invention. extrusion cans of aluminum, copper, stainless steel, or carbon steel having suitable wall thickness in the range of about 0.25 to about 1.0 inch proved satisfactory.

Preform 10 may be preheated conventionally as by heating means 21 to a temperature appropriate for the intended extrusion through die 13. Die 13 may also be heated conventionally as by heating means 23 to provide desirable preselected reduction of diameter of preform billet 10 to that of extrusion 25. The temperature at which preform billet 10 is extruded depends on material selections for components 15,17. Co-extrusions performed in demonstration of the invention showed that in selecting an appropriate extrusion temperature for preform billet 10, consideration of the melting point of the material comprising the bore component 15 was most critical in obtaining extrusions 25 of the desired rim thickness and overall outside diameter. Accordingly, optimum extrusion temperatures were in the range of from about 50 percent to about 90 percent, and preferably about 85 percent, of the melting point in °K. of the bore component 15.

Figure 3:
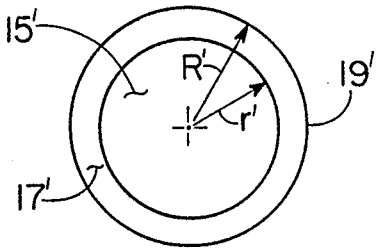
FIG. 3 is a view along line B—B of the extruded billet of FIG. 1.

Referring now additionally to FIG. 3, shown therein is a sectional view along line B—B of extrusion 25, which, taken with the sectional view of FIG. 2. illustrates the reduction of bore component 15 radius r in preform billet 10 to r′ in component 15′ of extrusion 25, of rim component 23 thickness (R-r) in preform billet 10 to (R′-r′) in component 17′ of extrusion 25, and of the reduction in thickness of extrusion can 19 as a result of the extrusion through die 13. The radius of bore component 15 and the thicknesses of rim component 17 and of any additional rings of material therebetween may be selected according to desired end product specifications. Engine disks fabricated of the preferred components 15, 17 listed above have a ratio R′/r′ in the range of from about 1.1 to about 2.5. Accordingly, in extrusions made in demonstration of the invention, best results were obtained wherein the ratio of R/r in preform billet 10 was from about 2.0 to about 2.5, and extrusions were made at the selected temperature defined above through die 13 having an extrusion ratio of about 3:1 to about 8:1.

Extrusion 25 may be subjected to more than one stepwise extrusion process to provide a desired overall reduction from the initial preform billet 10 diameter R to the finished product having the desired radial variation of component materials. Once extrusion 25 of the desired reduction (diameter R′) is obtained, extrusion can 19′ is conventionally stripped therefrom and the product comprising the extruded bore and rim components 15′,17′ is worked by forging, heat treating, or otherwise to end product specifications and cut as at 27 to define a finished disk 29. Disk 29 is then further treated and/or machined to intended size and peripheral shape of the completed turbine engine disk or like component.

The invention therefore provides a novel inexpensive method for fabrication of high temperature operating gas turbine engine disks by co-extrusion. Engine disks having superior structural and metallurgical properties may be fabricated from two separate metals or alloys wherein a solid state metallurgical bond is achieved therebetween without welding. It is understood that modifications to the invention may be made as might occur to one with skill in the field of the invention within the scope of the claims. All embodiments contemplated hereunder which accomplish the objects of the invention have therefore not been shown in complete detail. Other embodiments may be developed without departing from the spirit of the invention or from the scope of the claims.

We claim:

1. A method for fabricating a high temperature resistant disk for a gas turbine engine, comprising the steps of:

(a) preparing a cylindrical shaped preform billet from at least two materials, said preform billet having a central bore region defined along a central axis of said preform billet, said bore region being of preselected radius r and comprising a first material of said at least two materials and a rim region surrounding said bore region to a preselected radius R of said preform billet, said rim region comprising a second material of said at least two materials;

(b) extruding said preform billets at preselected extrusion temperature through an extrusion die to form an extrusion product of preselected reduction; and (c) cutting said extrusion product to preselected axial thickness to define a disk of preselected diameter and thickness.

2. The method of claim 1 wherein said extrusion is performed at a temperature in the range of from about 50 to 90 percent of the melting point in °K. of said first material.

3. The method of claim 2 wherein said extrusion is performed at a temperature corresponding to about 85 percent of the melting point in °K. of said first material.

4. The method of claim 1 wherein the extrusion ratio of said die is between 3:1 and 8:1.

5. The method of claim 2 wherein the ratio R:r is selected in the range of from 1.1 to 2.5.

6. The method of claim 1 wherein said first material is selected from the group consisting of Ti6-4, Ti-17, Ti6-2-4-6, Rene-95, Inco-718, Rene-88DT, and In-100, and the second material is selected from the group consisting of Ti6-2-4-2, IMI-829, Astroloy, U-500, U-700, U-720, Rene-41, and Merl-76.

7. The method of claim 1 wherein said preform billet is contained in an extrusion can.

8. The method of claim 7 wherein said extrusion can comprises a material selected from the group consisting of aluminum, copper, stainless steel, and carbon steel.

9. The method of claim 8 wherein said extrusion can has wall thickness of 0.25 to 1.0 inch.

* * * * *